(12) United States Patent
Hashimoto et al.

(10) Patent No.: US 6,720,082 B1
(45) Date of Patent: Apr. 13, 2004

(54) GLASS IMPROVED IN IMPACT RESISTANCE

(75) Inventors: Masao Hashimoto, Yokohama (JP); Yuji Komori, Yokohama (JP); Yasuhiro Iino, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/069,171

(22) PCT Filed: Aug. 25, 2000

(86) PCT No.: PCT/JP00/05752
§ 371 (c)(1),
(2), (4) Date: Feb. 22, 2002

(87) PCT Pub. No.: WO01/14137
PCT Pub. Date: Mar. 1, 2001

(30) Foreign Application Priority Data

| Aug. 25, 1999 | (JP) | 11/237770 |
| Aug. 25, 1999 | (JP) | 11/237771 |
| Oct. 12, 1999 | (JP) | 11/289756 |
| Dec. 21, 1999 | (JP) | 11/363025 |
| Jan. 27, 2000 | (JP) | 2000-018135 |

(51) Int. Cl.$^7$ ............ B32B 17/10; C03C 27/12
(52) U.S. Cl. ............ 428/437; 428/436; 428/441; 428/442
(58) Field of Search ............ 428/212, 215, 428/216, 328, 332, 335, 336, 437, 436, 441, 442

(56) References Cited

U.S. PATENT DOCUMENTS

| 4,910,074 | A | * | 3/1990 | Fukawa et al. | 428/215 |
| 5,695,851 | A | * | 12/1997 | Watanabe et al. | 428/147 |
| 5,830,568 | A | * | 11/1998 | Kondo | 428/328 |

* cited by examiner

Primary Examiner—D. S. Nakarani
(74) Attorney, Agent, or Firm—Sughrue Mion, PLLC (57) ABSTRACT

The present invention provides a glass improved in impact resistance, which has excellent impact resistance and penetration resistance. The constitution of the glass consists of a glass plate, an organic resin layer containing ethylene-vinyl acetate copolymer provided thereon, and a film comprising an organic polymer provided on the layer. The organic resin layer may have conductivity and the film may have a hard coat layer thereon.

9 Claims, 8 Drawing Sheets

GLASS IMPROVED IN IMPACT RESISTANCE

BACKGROUND OF INVENTION

1. Field of the Invention

The present invention relates to a glass improved in impact resistance which has excellent impact resistance and penetration resistance (resistance to passing through) and which is used for an automobile, a railway vehicle, a building and a showcase, particularly to a glass improved in impact resistance that is a film-reinforced glass including a sheet of glass which is effective in prevention of crimes.

2. Description of the Related Art

As a glass used in automobile, especially windshield, a laminated glass having a structure that two sheets of glass are bonded through an organic resin layer (intermediate layer) is generally employed. The organic resin layer is, for example, composed of PVB (polyvinyl butyral) layer, and the use of the organic resin layer enhances penetration resistance of the laminated glass. If external impact is given the laminated glass, the organic layer prevents the glass from scattering because the layer adheres to pieces of broken glass. Even if the laminated glass for automobile is destroyed for the purpose of robbery or invasion, the window of the laminated glass cannot be opened. Hence, the laminated glass is useful as glass for prevention of crimes.

In contrast, side glasses of automobile such as a door glass and a glass fitted in window are scarcely destroyed due to traffic accident, and therefore the glasses do not need the penetration resistance that the above-mentioned laminated glass has. As a result, for the door glass, a sheet of glass comprising slightly reinforcing glass has been employed. However, in case only such a sheet of glass is used in the door glass, the use brings about the following disadvantages:

(1) the glass is poor in impact resistance and penetration resistance (passing through resistance) compared with the laminated glass;

(2) when the glass is destroyed for the purpose of robbery or invasion, it turns into many pieces of the glass to permit window to open.

Therefore, it is now under investigation to use a glass having characteristics of the laminated glass for the side glasses of an automobile (e.g. a door glass and fitted glass).

Such a laminated glass is described for example in JP-A06-321857 for especially a door glass of automobile. The laminated glass has a five-layered structure comprising a polycarbonate plate (core material), and two pre tempered silicate glasses (outer plates) bonded onto the polycarbonate plate through thermoplastic polyurethane layer.

As mentioned above, however, the door glass generally is a sheet of glass, and does not require the thickness and strength that the laminated glass has. Further, the thick laminated glass cannot be occasionally employed for the door glass or fitted glass of a small-sized automobile owing to the thickness. Furthermore, the five-layered laminated glass needs complicated process compared with a sheet of glass.

Thus, a glass improved in impact resistance having a small thickness, which has excellent impact resistance and penetration resistance and is effective in prevention of crimes, is desired. Such a glass improved in impact resistance is also desired not only in an automobile, but also in a railway vehicle, a building and a showcase, because a glass plate used in the latter uses also needs excellent impact resistance and penetration resistance in view of crimes.

SUMMARY OF THE INVENTION

The object of the present invention is to provide a glass improved in impact resistance, especially one having a small thickness, which has excellent impact resistance and penetration resistance as well as effective crime prevention, and which is used for a glass plate used in an automobile, a railway vehicle, a building and a showcase.

Meanwhile, polyvinyl butyral (hereafter referred to as PVB) is conventionally used for an intermediate layer of a laminated glass. The PVB is thermoplastic resin and therefore easily influenced by water moisture. For example, in case a laminated glass having the intermediated layer of polyvinyl butyral is allowed to stand in atmosphere of high humidity, the glass whitens in the periphery portion. In view of poor water resistance of the PVB, JP-A57-196747 describes use of ethylene-vinyl acetate copolymer (EVA) having excellent water resistance instead of PVB for the intermediate layer of the laminated glass. The laminated glass interposing EVA layer is often inferior in transparency to one interposing PVB. Further, when a laminated glass is used as a windshield, it should satisfy ECE standard specification R-43 or Head Form Impact Test according to JIS standard in view of safety at time of impact and crime prevention.

The object of the present invention is also to provide a glass improved in impact resistance satisfying the above demand, i.e., excellent impact resistance and penetration resistance as well as effective crime prevention and which can be used in an automobile, a railway vehicle, a building and a showcase, and especially provides a glass improved in impact resistance which has excellent in transparency and durability.

Meanwhile, with spread of a cellular phone, traffic accidents occurring owing to the use of the cellular phone by a driver under driving have been rapidly increased recently. Further, there are problems that the use of the cellular phone within a building such as a hospital or a railway vehicle brings about adverse effect to apparatus such as a pacemaker or inspection machine. Therefore, the use of the cellular phone within public spot is expected to be prohibited by law such as Road Traffic Act.

Even if the use of the cellular phone is prohibited by law, it can not be expected that no person uses the cellular phone so long as the cellular phone is present.

Hence, the object of the present invention is further to provide a glass improved in impact resistance which has excellent impact resistance and penetration resistance and which is effective in prevention of crimes, and further wherein electromagnetic interference sealing property is given so as not to be used as a window glass in an automobile, a railway vehicle and a building.

The present inventors have studied to attain the above objects, and consequently reached the following glasses improved in impact resistance.

A first invention of the present invention is provided by a glass improved in impact resistance which comprises one glass plate, an organic resin layer containing ethylene-vinyl acetate copolymer provided thereon, and a film comprising an organic polymer provided on the layer, wherein the film has a hard coat layer thereon which has been formed from ultraviolet curing resin.

In the glass improved in impact resistance of the first invention, the organic resin layer preferably contains ethylene-vinyl acetate copolymer in the whole area of the layer. In order to particularly enhance durability of the glass, the organic resin layer preferably contains ethylene-vinyl acetate copolymer in an area including at least an upper edge of the glass plate, and contains polyvinyl butyral in the other area (this embodiment corresponds to the preferred embodiment of a third invention mentioned later). Further the ethylene-vinyl acetate copolymer has been preferably cured in view of the durability.

To give electromagnetic interference sealing property to the glass, it is preferred that the organic resin layer contains conductive material dispersed therein.

The organic polymer of the film preferably is polyethylene terephthalate in view of improvement of impact resistance. The hard coat layer is formed from UV (ultraviolet)-curing resin in view of easiness of its production. The hard coat layer preferably comprises at least two layers selected from a scratch-resistant hard coat layer, a fog-resistant hard coat layer, a conductive hard coat layer, an antistatic hard coat layer, a hard coat layer having high gloss, a solvent-resistant hard coat layer and a hard coat layer having low permeability, to give various functions to the glass.

Moreover, the organic resin layer preferably has a thickness of 0.1 to 1.0 mm, the glass plate preferably has a thickness of 1 to 10 mm, and the film preferably has a thickness of 0.1 to 2 mm.

A second invention of the present invention is provided by a glass improved in impact resistance which comprises a glass plate, another glass plate or an organic polymer provided thereon, and an organic resin layer containing ethylene-vinyl acetate copolymer provided therebetween, wherein the organic resin layer comprises an organic resin and conductive material dispersed therein.

In the second invention, the organic polymer of the film preferably is polyethylene terephthalate, and a hard coat layer is preferably formed on a surface of the film.

A third invention of the present invention is provided by a glass improved in impact resistance which comprises a glass plate, another glass plate or an a film comprising an organic polymer provided thereon, and an organic resin layer provided therebetween, wherein the organic resin layer contains ethylene-vinyl acetate copolymer in an area including at least an upper edge of the glass plate, and contains polyvinyl butyral in the other area.

The glass improved in impact resistance of the third invention is excellent especially in durability and transparency. The area including at least upper edge of the glass plate preferably corresponds to a peripheral area of the glass plate in view of productivity. It is preferred that a portion containing ethylene-vinyl acetate copolymer of the organic resin layer and a portion containing polyvinyl butyral are each prepared separately in the form of sheet and provided in predetermined positions by bonding under pressure, and also that a portion containing ethylene-vinyl acetate copolymer of the organic resin layer and a portion containing polyvinyl butyral are each provided separately in predetermined positions by a coating method.

DETAILED DESCRIPTION OF THE INVENTION

A glass improved in impact resistance of a first invention according to the invention is obtained by laminating on a glass plate, an organic resin layer consisting of EVA (ethylene-vinyl acetate copolymer) as main component and a film comprising an organic polymer, and further forming on the film a hard coat layer which has been formed from ultraviolet curing resin, and the laminated glass is particularly improved in prevention of crimes. This EVA can contain additives such as a plasticizer and organic peroxide. Further, the film of organic polymer uses, for example polyethylene terephthalate (hereafter referred to as PET).

The glass improved in impact resistance of the invention has proper performance in impact resistance and penetration resistance, owing to the above structure. Therefore the glass can be preferably used as a window glass in various vehicles such as an automobile and a railway vehicle and building, and as a glass in show-window and showcase. In more detail, it is needed that such a glass prevents the inside of the vehicle from invasion from outside by destroy to lead to prevention of crimes, whereas it is also needed that the glass has proper impact resistance and penetration resistance so that it can be destroyed in case of emergency such as traffic accident. Hence, the glass improved in impact resistance of the invention can be preferably used in the above applications.

Figure 1:
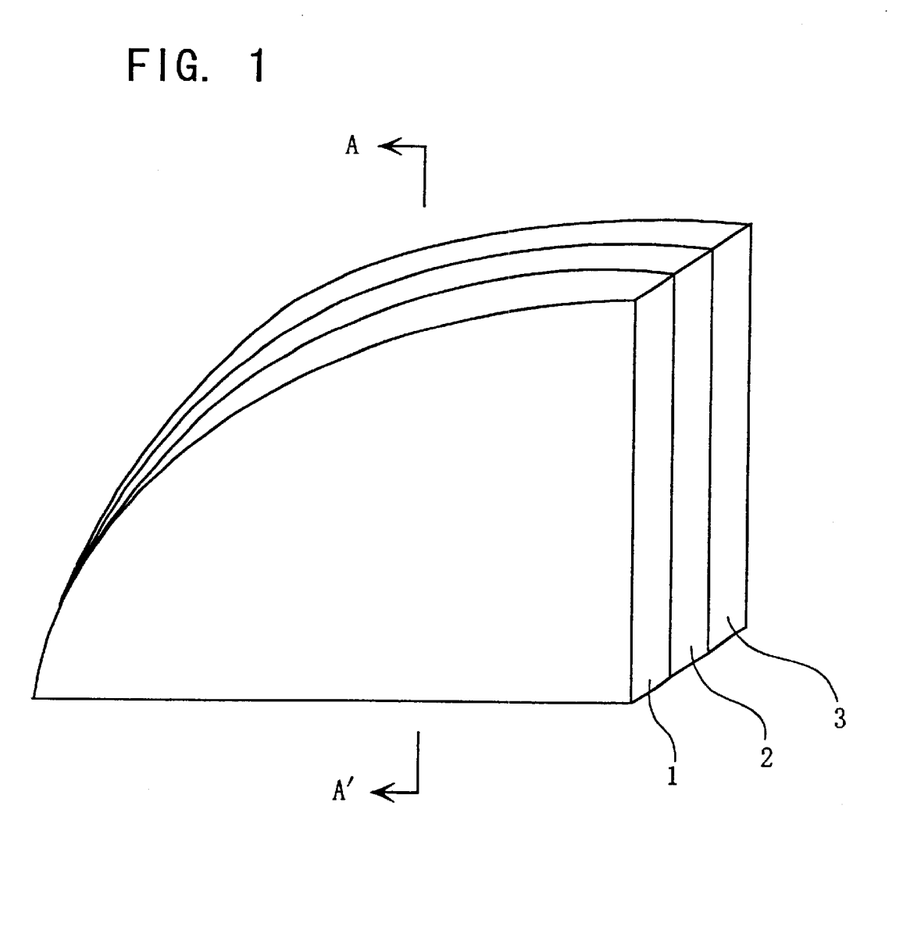
FIG. 1 is a perspective view for explaining a preferred embodiment of the glass improved in impact resistance of the first invention according to the invention.
Figure 2:
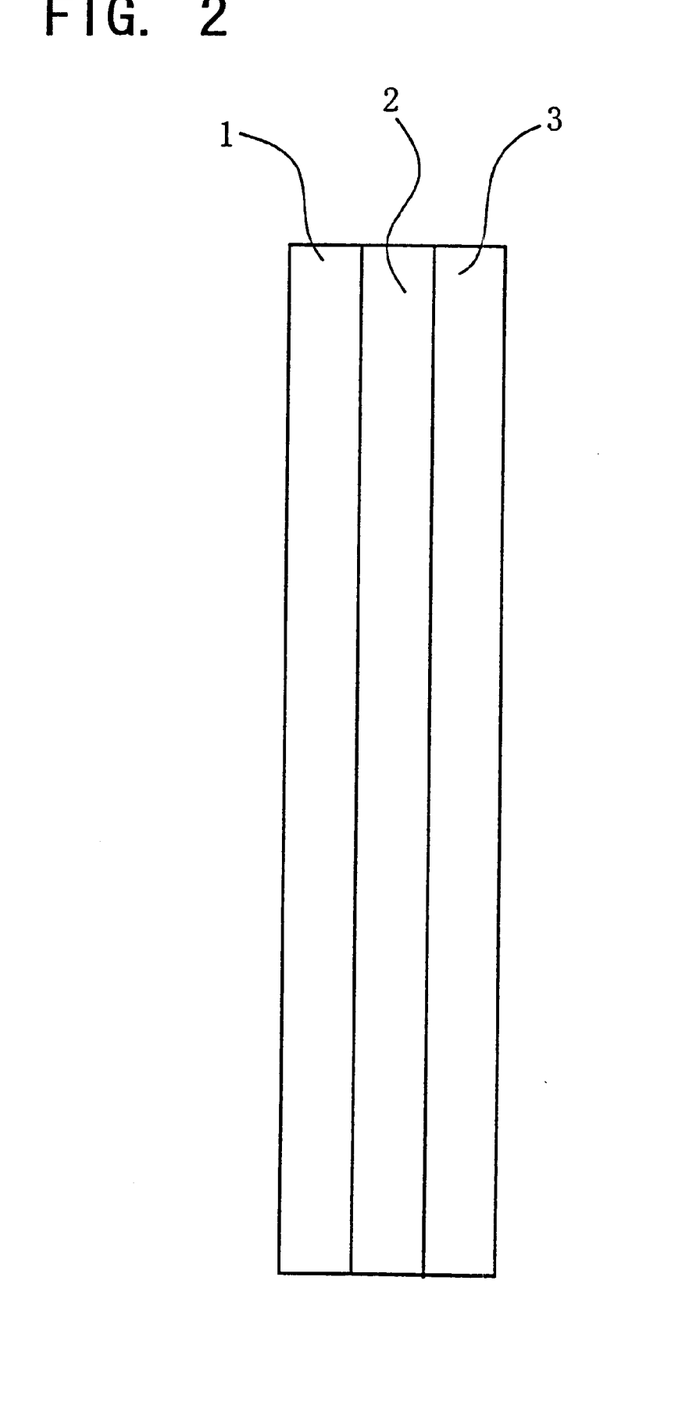
FIG. 2 is a section view taken along a line A–A' in FIG. 1.

Referring to FIG. 1 and FIG. 2, the glass improved in impact resistance of a first invention according to the invention is described in detail.

In FIG. 1, an organic resin layer 2 is laminated on a glass plate 1, and a film 3 comprising organic polymer is laminated on the organic resin layer 2. The organic resin layer 2 consists of a resin composition which contains EVA as main component in view of water resistance and durability though a little poor in water resistance, and preferably cured by heating. The organic resin layer 2 basically serves to give penetration resistance and also to improve adhesion to the film 3.

As the organic polymer of the film 3, for example, PET having high strength is used. The organic polymer film 3 is provided to prevent the glass plate from breaking down, while a hard coat layer is further formed on the film to enhance scratch resistance of its surface. As mentioned above, the use of the film gives the above excellent characteristics to a sheet of glass plate, and therefore it is possible to use the glass improved in impact resistance of the invention as a side glass or inserted glass (e.g. rear glass) of an automobile (e.g. small-sized car).

FIG. 2 shows a section view taken along a line A–A' in FIG. 1. FIG. 2 distinctly indicates that the glass improved in impact resistance is composed of one glass plate 1, the organic polymer film 3 and the organic resin layer 2 provided between the plate and the film. When the thickness of the organic resin layer is smaller, the glass improved in impact resistance is lowered in strength of penetration resistance, whereas its larger thickness brings about reduction of transparency. Further the thickness is set depending upon the location for using the glass improved in impact resistance. For example, in case the glass improved in impact resistance is used as a side glass or inserted glass, the organic resin layer need not to have the thickness of windshield and therefore its thickness is generally in the range of 0.1 to 10 mm, preferably 0.3 to 3 mm. Similarly, the thickness of the organic polymer film is generally in the range of 0.1 to 2 mm, preferably 0.5 to 1 mm. The thickness of the organic resin layer 2 and the film 3 can be altered depending on where the glass is used.

The glass improved in impact resistance can be prepared by a process comprising placing an organic resin layer 2 on a sheet of glass plate 1, and further placing an organic polymer film 3 on the resin layer, the shapes of the organic resin layer 2 and the film 3 being the same as the glass plate 1, and bonding them one another under the application of pressure. The bonding under pressure is generally carried out using a heated roll. The bonding may be conducted using an adhesive. Subsequently, if desired, a hard coat layer is formed on the film 3.

The glass improved in impact resistance of the invention is characterized in that the organic polymer film 3 is laminated on the glass plate 1 through the organic resin layer 2 as previously mentioned. In more detail, EVA used in the organic resin layer 2 for bonding the film to the glass has excellent water resistance. For example, in case a conventional film-reinforced glass having such three layers is used in a door glass of automobile, the glass is frequently in contact with a flame of window because the door glass is caused to move up and down, whereby the film is apt to be peeled from the glass. However, the glass improved in impact resistance of the invention is enhanced in water resistance as mentioned above, and therefore the film is scarcely peeled from the glass. Further, even if the glass improved in impact resistance of the invention is destroyed for the purpose of crime, the destroyed pieces are bonded to each other through the organic resin layer to prevent the opening and shutting of the window. Hence the glass of the invention is useful as a glass for prevention of crimes.

Moreover the organic resin layer may contain ethylene-vinyl acetate copolymer in an area including at least upper edge of the glass plate, and contains polyvinyl butyral in the other area. Thereby the glass having the resin layer enhances in durability. Further the ethylene-vinyl acetate copolymer has been preferably cured in view of the durability. The area including at least upper edge of the glass plate is preferably corresponded to the periphery of the glass plate. Such an organic resin layer is described in detail in a third invention.

The glass plate of the invention generally comprises silicate glass. The thickness of the glass plate is varied depending on where the reinforced glass of the invention is used. For example, in case the glass improved in impact resistance is used as a side glass or inserted glass of automobile, the glass plate need not have the thickness of windshield and therefore its thickness is generally in the range of 1 to 10 mm, preferably 1 to 6 mm, especially 3 to 5 mm. The glass plate 1 is tempered in heat or chemical resistance.

In EVA used in the organic resin layer 2 of the invention, the content of vinyl acetate preferably is in the range of 10 to 50% by weight, especially 15 to 40% by weight. When the content is less than 10% by weight, the resin cured at high temperature does not show satisfactory transparency. On the other hand, when the content is more than 50% by weight, the resin extremely reduces in mechanical strength not to satisfy impact resistance and penetration resistance required in the glass for prevention of crimes.

An EVA-containing resin composition used in the organic resin layer 2 can contain additives such as a plasticizer, organic peroxide and an adhesion promoter.

As the plasticizer, polybasic acid esters and polyhydric alcohol esters are generally employed although its materials can be used without any restriction. Examples of the esters include dioctyl phthalate,d dihexyladipate, triethylene glycol-di-2-ethylbutylate, butyl sebacate, tetraethylene glycol heptanoate and triethylene glycol dipelargonate. The plasticizer can be used singly, or in combination of two or more kinds. The content of the plasticizer is generally in an amount of not more than 5 parts by weight based on 100 parts by weight of EVA.

Figure 3:
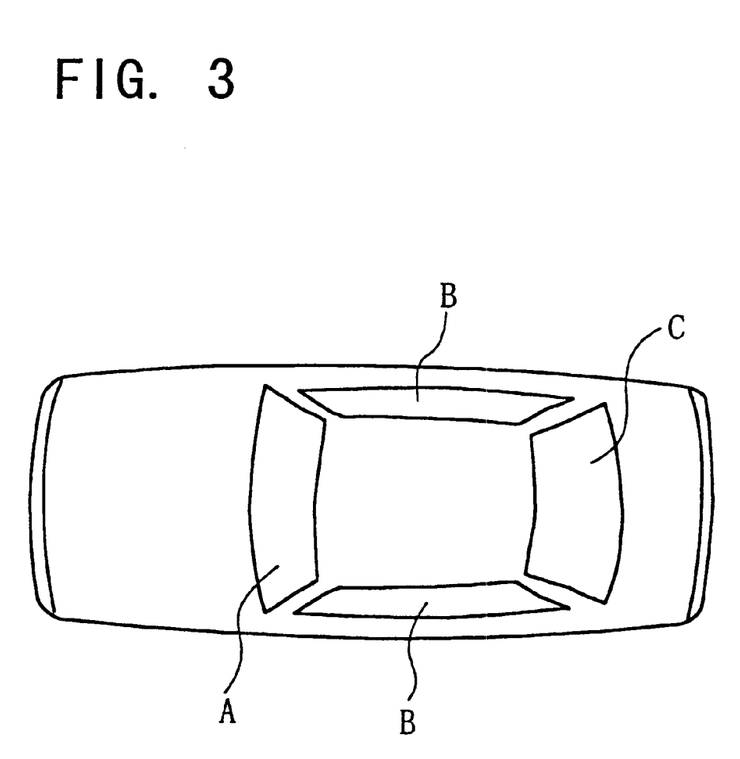
FIG. 3 is a plain view of an automobile.

The EVA-containing resin composition used in the organic resin layer 2 can contain organic peroxide as an adhesion adjuster for adjusting adhesion between the glass plate 1 and the organic polymer film 3. The resin composition containing the organic peroxide is enhanced in heat-curing property, and therefore the cured organic resin layer shows high film strength.

As the organic peroxide, any materials that can be decomposed at a temperature of not less than 100° C. to generate radical(s) can be employed. The organic peroxide is selected in the consideration of film-forming temperature, condition for preparing the composition, curing (bonding) temperature, heat resistance of body to be bonded, storage stability. Especially, preferred are those having a decomposition temperature of not less than 70° C. in a half-life of 10 hours.

Examples of the organic peroxide include 2,5-dimethylhexane-2,5-dihydroperoxide, 2,5-dimethyl-2,5-(t-butylperoxy)hexane-3-di-t-butylperoxide, t-butylcumyl peroxide, 2,5-dimethyl-2,5-di(t-butylperoxy)hexane, dicumyl peroxide, α,α'-bis(t-butylperoxyisopropyl) benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethyl-2,5-bis(t-butylperoxy)-3,3,5-trimethylcyclohexane, 1-bis(t-butylperosy)cyclohexane, 2,5-dimethylhexyl-2,5-bisperoxybenzoate, t-butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, t-butylperoxyisobutylate and 2,4-dichlorobenzoyl peroxide. The organic peroxide can be used singly, or in combination of two or more kinds. The content of the organic peroxide is preferably in an amount of 0.1 to 5 parts by weight based on 100 parts by weight of EVA.

In case EVA is cured by light, photosensitizer (photoinitiator) is used instead of the organic peroxide, and it is generally used in an amount of not more than 5 parts by weigh, preferably 0.1 to 5 parts by weight based on 100 parts by weight of EVA.

Examples of the photoinitiator include benzoin, benzophenone, benzoyl methyl ether, benzoin ethyl ether, benzoin isopropyl ether, benzoin isobutyl ether, dibenzyl, 5-nitroacenaphtene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone. The photoinitiators can be used singly, or in combination of two or more kinds.

The organic resin layer 2 of the invention preferably contains acryloyl(oxy) group containing compounds, methacryloyl(oxy) group containing compounds and/or epoxy group containing compounds for improvement or adjustment of various properties of layer (e.g., mechanical strength, adhesive property, optical characteristics such as transparency, heat resistance, light-resistance, rate of crosslinking), particularly for improvement mechanical strength. These compounds are generally used in an amount of not more than 50 parts by weigh, preferably not more than 10 parts by weigh, especially 0.1 to 2 parts by weight based on 100 parts by weight of EVA.

Examples of the acryloyl(oxy) and methacryloyl(oxy) group containing compounds include generally derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, 3-chloro-2-hydroxtpropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol.

Example of the amide includes diacetone acrylamide.

Examples of polyfunctional compounds include esters of plural acrylic acids or methacrylic acids with polyhydric alcohol such as glycerol, trimethylol propane or pentaerythritol.

Examples of the epoxy group containing compounds include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)$_5$glycidyl ether, p-tert-butylphenyl glycidyl ether, diglycidyl adipate, diglycidyl phthalate, glycidyl methacrylate and butyl glycidyl ether.

In the invention, a silane coupling agent can be added to the organic resin layer for enhancing the adhesive strengths between the resin layer 2 and the glass plate 1 and between the resin layer 2 and the organic polymer film 3.

Examples of the silane coupling agent include γ-chloropropylmethoxysilane, vinyltriethoxysilane, vinyltris(β-methoxyethoxy)silane, γ-methacryloxypropylmethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane. The silane coupling agents can be used singly, or in combination of two or more kinds. The content of the silane coupling agent is preferably in an amount of not more than 5 weight by part, particularly 0.001 to 5 parts by weight based on 100 parts by weight of EVA.

The organic resin layer of the invention can further contain a small amount of ultraviolet absorbing agent, infrared absorbing agent, age stabilizer (antioxidant), paint processing aid and colorant. If appropriate, filler such as hydrophobic silica or calcium carbonate may be contained in a small amount.

The organic resin layer can be obtained using a conventional process for preparing sheet by, for example, extrusion molding or calendaring molding. Otherwise, a body in the form of sheet can be prepared by dissolving the composition for the resin layer in a solvent to give a solution, coating the solution onto an appropriate support by a coater, and drying the coated solution to form a coated layer.

The organic resin layer may be a conductive layer so as to have electromagnetic interference sealing property. In more detail, the organic resin layer can be a layer containing conductive material dispersed therein, or a layer having a conductive layer provided thereon, or a layer comprising two organic resin layers having the conductive layer therebetween. The conductive layer preferably is a transparent conductive layer or conductive mesh. The above-mentioned layer having conductive property is explained in more detail in the third invention described later.

Examples of the organic polymer used in the film 3 of the invention include PET, polyethylene nahpthalate and polyethylene butyrate.

A hard coat layer can be provided on the film 3 comprising an organic polymer. As a resin for forming the hard coat layer, UV (ultraviolet) curing resin can be generally employed. Further, any of low molecular and polyfunctional resins suitable for forming a hard coat layer are usable. Examples of materials for the UV curing resin include oligomers such as urethane oligomer, polyester oligomer and epoxy oligomer which have plural ethylenically double bonds; and mono- or polyfunctional oligomers such as pentaerythritol tetraacrylate (PETA), pentaerythritol tetramethacrylate and dipentaerythritol hexaacrylate (DPEHA). The UV curing resin generally consists of oligomer, photoinitiator and if necessary reactive diluent (monomer).

Examples of the photoinitiator include benzoin, benzophenone, benzoyl methyl ether, benzoin ethyl ether, benzoin isopropyl ether, benzoin isobutyl ether, dibenzyl, 5-nitroacenaphtene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone. The oligomers, reactive diluents and photoinitiators can be each used singly, or in combination of two or more kinds. The content of the diluent is preferably in an amount of 0.1 to 10 parts by weight, particularly 0.5 to 5 parts by weight based on 100 parts by weight of UV curing resin. The content of the photoinitiator is preferably in an amount of not more than 5 parts by weight based on 100 parts by weight of UV curing resin.

The glass improved in impact resistance provided with the hard coat layer according to the invention can be obtained by superposing the organic resin layer 2 in the form of sheet and the film 3 comprising an organic polymer in this order on the one glass plate 1 to give a laminate in sandwich structure, degassing the laminate, and pressing the laminate under heating, and then forming the hard coat layer on the film. Otherwise, after the superposing step, a hard coat coating solution may be applied onto the film and cured by UV irradiation, and then pressed under heating.

Although the hard coat layer is generally composed mainly of the above materials, hard coat layers having various excellent functions can be obtained by using further those obtained by modifying the above oligomers, other functional resin and additives. These examples include a high scratch-resistant hard coat layer having further enhanced scratch-resistance, a fog-resistant hard coat layer having fog-resistance, a conductive hard coat layer having conductivity, an antistatic hard coat layer having antistatic properties, a hard coat layer having high gloss, a solvent-resistant hard coat layer especially improved in solvent resistance and a hard coat layer having low permeability into which moisture scarcely permeates. Depending on use, at least two of these hard coat layers are preferably used. Only one layer may be used.

The high scratch-resistant hard coat layer is generally a layer having pencil hardness of not less than 8H, especially not less than 9H. The conventional hard coat layer generally has pencil hardness of not less than 5H. To enhance scratch-resistant, for example, it is necessary to increase the pencil hardness. In this case, the hard coat layer should be prevented from cracking by reduction of the thickness. The high scratch-resistant hard coat layer can be formed by using, for example, trade name UVCH1105 available from Toshiba Silicone Corp.

The fog-resistant hard coat layer is a layer in which dew condensation and induction of transparency do not occur even if the layer is brought into contact with water vapor. To give fog-resistance, it is necessary to use hydrophilic oligomers and monomers or surfactants (especially wetting agent) as the materials. The fog-resistant hard coat layer can be formed using, for example, trade name DIABEAM MH-3263 available from Mitsubishi Rayon Co., Ltd.

The conductive hard coat layer is a layer having high conductivity, which generally has electrical conductivity of $10^2$ to $10^4$ s/cm. To give conductivity to cut electromagnetic wave, it is necessary to introduce conductive materials such as carbon black and metals (e.g., silver, copper and nickel) into the layer. The conductive hard coat layer can be formed by using, for example, trade name CONDUCTIVE EJ-3 available from Dai Nippon Toryo Co., Ltd.

The antistatic hard coat layer is a layer that does not easily generate static electricity by rubbing, which generally has volume resistivity of not more than $10^{12}$ •·cm. To give antistatic properties, it is necessary to, for example, use various surfactants or oligomers and monomers having surfactant group. The antistatic hard coat layer can be formed by using, for example, trade name SUNRAD UXH601 available from SANYO CHEMICAL INDUSTRIES, LTD.

The hard coat layer having high gloss is generally a layer of gloss of not less than 95 (according to JIS K 7105). To give high gloss, it is necessary to, for example, appropriately combine various oligomers and monomers. The high gloss hard coat layer can be formed using, for example, trade name ADEKA OPTMER KR-567 available from ASAHI DENKA KOGYO K.K.

Although the hard coat layer is excellent in solvent resistance per se, the solvent-resistant hard coat layer is a layer having excellent resistance to high polar solvent (e.g., DMF). To improve solvent resistance, it is necessary to, for example, use silicon- or fluorine-modified oligomers, monomers or resin. The hard coat layer improved in solvent resistance can be formed by using, for example, trade name Silicone Hard Coat Agent KP851 available from Shin-Etsu Chemical Co., Ltd.

The hard coat layer having low permeability is a layer into which moisture scarcely permeates, and generally has permeability of not more than 0.5 g/m²·24 h (according to JIS Z 0208). To allow moisture to scarcely permeate into the layer, it is necessary to, for example, use silicon- or fluorine-modified oligomers, monomers or resin. The low permeable hard coat layer can be formed by using, for example, trade name Ultraviolet Curing Resin having Low Permeability available from NIPPON KASEI Co., Ltd.

The above-mentioned functional hard coat layers can be used, for example, to give both scratch-resistance and fog resistance to the inside surface of glass for automobile. Such glass can be preferably obtained by forming a scratch-resistant hard coat layer and a fog-resistant hard coat layer in this order on the inside surface of window of automobile (generally the surface of the film 3). To give both high scratch-resistance and cutting of electromagnetic waves to an inside surface of a glass for automobile (generally the surface of the film 3), it is preferred to form a conductive hard coat layer and a scratch-resistant hard coat layer in this order on an inside surface of a window of automobile.

The thickness of the hard coat layer is generally in the range of 0.1 to 20 μm, preferably 1 to 15 μm. The range corresponds to a thickness of a single layer and to a total thickness of plural layers.

On the surface of one glass plate 1, a transparent conductive layer comprising metal and/or metal oxide may be formed.

The glass improved in impact resistance prepared as above has excellent impact resistance and penetration resistance and is effective in prevention of crimes, and therefore can be employed for the following glasses: an inserted glass, a side glass (door glass) and a rear glass in an automobile; a door glass for passenger to go in or out and a door glass for chamber, and a window glass in a railway vehicle (e.g., corridor train, express train, special train, sleeping car), a window glass and a door glass in constructions such as building, a showcase for display, and a glass of show window. The glass improved in impact resistance is preferably employed inserted glass, for a glass (door glass) and rear glass in an automobile, and a window glass in a railway vehicle, especially for a door glass in an automobile.

The various glasses in automobile are shown in FIG. 3. A front glass A is in front of the automobile (i.e., windshield), side glasses B are both side glasses of the automobile (e.g., side window glass), and a rear glass C is glass of rear window.

The glass improved in impact resistance of the second invention according to the invention relates to an electro-magnetic interference sealed glass. The glass improved in impact resistance comprises two transparent substrates (i.e., two glass plates, or a glass plate and a film comprising an organic polymer) and an organic resin layer provided therebetween, wherein the organic resin layer is a conductive layer, i.e., it has electrical conductivity.

In case the glass improved in impact resistance has electro-magnetic interference sealing property as mentioned above, the glass renders the use of a cellular phone impossible in the construction, railway vehicle and automobile which are provided with windows made of the glass so long as the windows are shut. In more detail, the glass (window) renders transmission and receipt of a message by the cellular phone impossible in the construction, railway vehicle and automobile provided with the windows. Hence, the use of the glass can securely prevent traffic accident and malfunction of machines in public facilities, which are caused by the use of the cellular phone.

In the second invention according to the invention, an organic resin layer having adhesive function is a conductive adhesive resin layer in which particles of conductive material are dispersed in the adhesive resin.

The adhesive resin of the organic resin layer preferable is EVA, especially cured (crosslinked) EVA in the same manner as the first invention.

For example, in case the glass improved in impact resistance is used as a windshield in automobile, it is preferred that the glass has structure comprising two glass plates and an adhesive resin layer provided for bonding the plates. Further, in case the glass improved in impact resistance is used as a side glass or rear glass in automobile, it is preferred that the glass has structure comprising a glass plates, an organic polymer film and an adhesive resin layer provided for bonding them.

The second invention is explained in detail by reference of FIG. 4.

Figure 4:
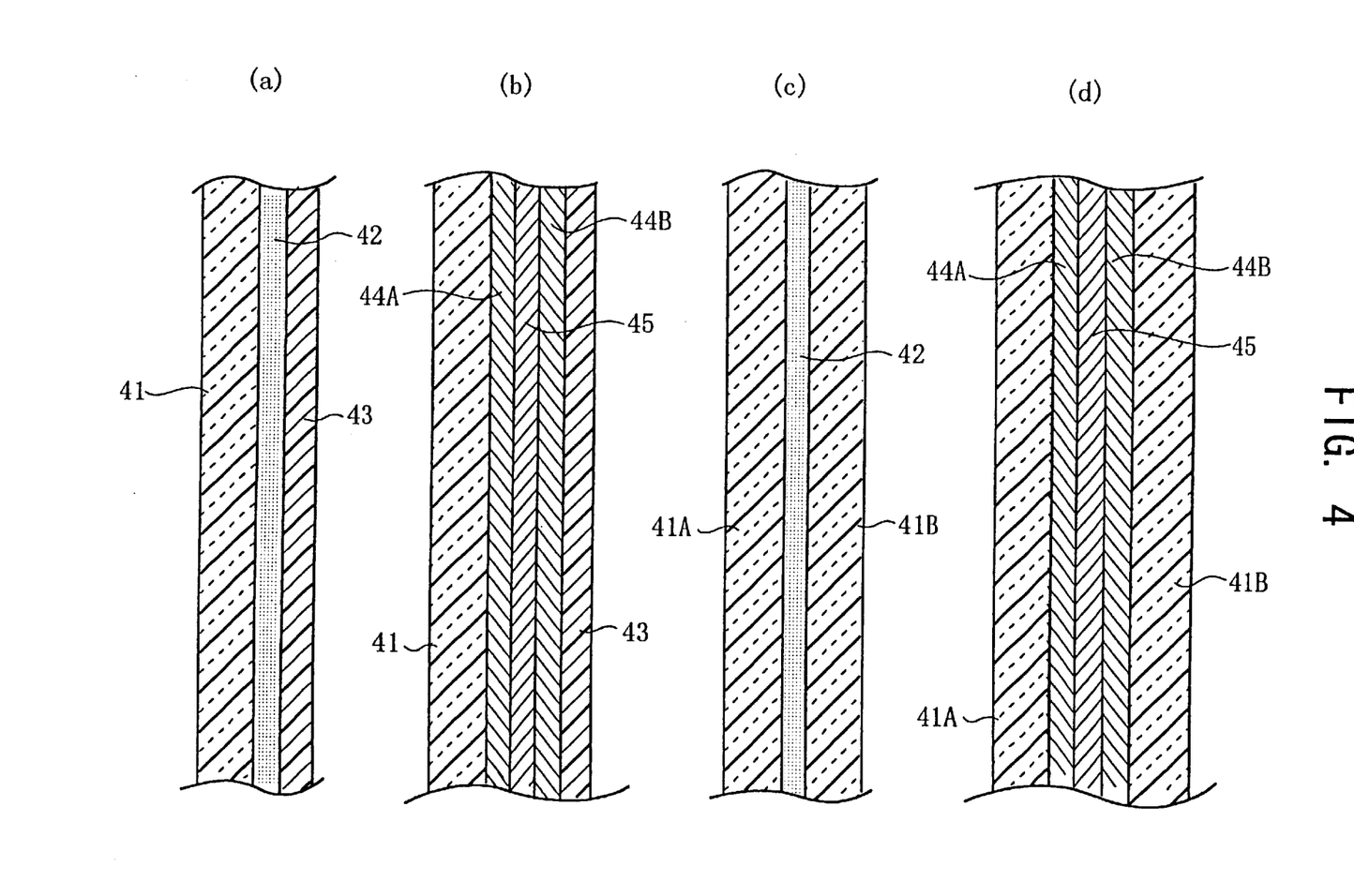
FIG. 4 is a section view showing a preferred embodiment of the glass improved in impact resistance of the second invention according to the invention.

FIG. 4 is a section view of one embodiment of the glass improved in impact resistance of the invention used for an electromagnetic interference sealed glass. In (a) and (b) of FIG. 4, the glass improved in impact resistance is incorporated in a body by bonding a glass plate 41 and a organic polymer film 43, which is used as windshield on automobile. In (c) and (d) of FIG. 4, the glass improved in impact resistance is incorporated in a body by bonding two glass plates 41A,41B, which is used as windshield on automobile.

As material of the glass plates 41,41A,41B, it is preferred to use silicate glass tempered by chemical or heat treatment. A thickness of the glass plates 41A, 41B for windshield is generally in the range of 3 to 6 mm, and a thickness of the glass plate 41 for a side or rear glass is generally in the range of 1 to 6 mm, especially approx. 3 mm which does not usually require such thickness as the windshield.

The organic polymer film 43 is preferably a polyethylene terephthalate (PET) film as previously mentioned, and the thickness is generally in the range of 0.1 to 2 mm, especially 0.5 to 1 mm.

Both of the glass plate 41,41A, 41B and the organic polymer film 43 are reduced in resistance to penetration when the thickness is too small, while they are lowered in transparency when the thickness is so large. Therefore, the thickness is selected from the above ranges depending upon the use.

In the invention, the surface of the organic polymer film 43 can be subjected to hard coating treatment. In more detail, although the organic polymer film 43 is provided to prevent the glass plate from being destroyed, it is preferred to form a hard coat layer on the polymer film 43 to enhancing scratching resistance of the surface. The hard coat layer can be formed in the same manner as the first invention.

In the second invention, adhesive resin for forming the organic resin layer preferably is EVA or PVB. Particularly for a windshield, PVB is suitable in view of impact resistance, resistance to penetration, adhesive property and transparency. In contrast, for a side or rear glass, EVB, which is excellent in water resistance to bring about enhancement of durability though transparency is not completely satisfied compared with PVB, is suitable because the side or rear glass does not need so transparency as the windshield needs.

PVB has preferably vinyl acetal unit of 70 to 95 weight % and vinyl acetal unit of 1 to 15 weight % (especially 5 to 15 weight %), average polymerization degree of 200 to 3,000 (especially 300 to 2,500). The PVB is generally used as a resin composition containing plasticizer.

Examples of the plasticizer include organic plasticizers monobasic acid ester and polybasic acid ester; and plasticizers derived from phosphoric acid.

Examples of the monobasic acid ester preferably include esters obtained by reacting organic acids (e.g., butyric acid, isobutyric acid, capric acid, 2-ethylbutyric acid, heptanoic acid, n-octyric acid, 2-ethylhexanoic acid, pelargonic acid (nonylic acid)) with triethylene glycol; especially triethylene-di-2-ethyl butyrate, triethylene glycol-di-2-ethyl hexoate (hexonic ester), triethylene glycol-di-capronate, triethylene glycol-di-n-ochotoate. Further, esters of one of the above-mentioned organic acid and tetraethylene glycol or tripropylene glycol can be used.

Examples of the polybasic acid ester plasticizers preferably include esters obtained by reacting organic acids (e.g., adipic acid, sebacic acid and azelaic acid) with linear or branched alcohol having 4 to 8 carbon atoms, especially dibutyl sebacate, dioctyl azelate, dibutylcarbitol adipate.

Examples of the phosphoric acid plasticizers include tributoxyethyl phosphate, isodecylphenyl phosphate, triisopropyl phosphate.

In the PVB resin composition, an insufficient amount of plasticizer reduces film-forming property, while excess of plasticizer lowers durability under high temperature. Hence, the plasticizer can be in the range of 5 to 50 parts by weight, especially 10 to 40 parts by weight based on 100 parts by weight of PVB.

Also in the third invention, EVA described in the first invention can be employed.

The organic resin layer, which is an adhesive resin layer, can be prepared by adding the above-mentioned various additives into an adhesive resin such as EVA or PVB, and molding the obtained mixture by means of extruding molding or calender molding to form product in the form of sheet. Otherwise, the organic resin layer can be prepared by mixing the above-mentioned various additives and an adhesive resin in a solvent to form a coating liquid, and applying the coating liquid onto a support by means of an appropriate coater and drying the coated liquid to form product in the form of sheet.

The glass improved in impact resistance of the invention having an electromagnetic interference sealing property, shown in (a) and (c) of FIG. 4, is a glass to which conductive property is given by inserting a conductive organic resin layer 42 between a glass plate 41 and a organic polymer film 43, or between glass plates 41A, 41B.

The conductive organic resin layer 42 can be prepared by mixing the adhesive resin with the various additives-together with conductive particles, and molding in the same manner as above.

The conductive particles to be used include any materials having conductive property, and for examples the followings:

(i) carbon black particles or powders,
(ii) particles or powders of metal such as nickel, indium, chromium, gold, vanadium, tin, cadmium, silver, platinum, aluminum, copper, titanium, cobalt or lead, or alloy thereof, or conductive oxide thereof,
(iii) plastic (e.g., polystyrene or polyethylene) particles having a coating layer of the conductive material mentioned above (i), (ii) on their surfaces.

The use of conductive particles having too large particle size affects light transmission and thickness of the obtained organic resin layer. Therefore, the particle size is preferably not more than 0.5 mm, especially in the range of 0.01 to 0.5 mm.

A mixed ratio of the conductive particles to the organic resin layer is excessively increased to reduce light-transmission, while the ratio is excessively lowered to give unsatisfactory electromagnetic interference sealing property. Therefore, the weight ratio of the conductive particles to the organic resin layer including EVA generally is in the range of 0.1 to 50% by weight, preferably 0.1 to 20% by weight, especially 0.5 to 20% by weight.

The color and gloss of the conductive particles are appropriately selected optionally. The glass for a windshield generally has blue tone to maintain enhanced ray transmission, while the glass for a side or rear glass generally has gray or bronze tone to adjust proper ray transmission.

The thickness of the organic resin layer 42, although it varies depending on uses such as a windshield and side and rear glasses, generally is in the range of 0.2 to 0.4 mm. The thickness of less than 0.2 mm is too thin to use a conductive layer as an electromagnetic sealed layer, which does not give sufficient electromagnetic sealing property. In case of more than 0.4 mm, the light transmission is apt to be reduced.

The glass improved in impact resistance of the invention having an electromagnetic interference sealing property, shown in (a) and (c) of FIG. 4, can be easily prepared by piling a organic polymer film 43 and a glass plate 41, or a glass plates 41A,41B, through a conductive organic resin layer 42 to give a composite, pre-laminating the composite under vacuum and heating, and then curing the organic resin under heating or irradiation to incorporate into one body.

In the glass improved in impact resistance having an electro-magnetic interference sealing property, shown in (b) and (d) of FIG. 4, the conductive property is given by inserting a conductive film 45 between organic resin layers 44A, 44B, which are formed by the previously described process. In this case, as the conductive film 45, a transparent film in which the conductive particles used in the above-mentioned conductive organic resin layer are dispersed in the same ratio as the layer can be employed. Examples of matrix resin of the conductive film 45 include polyester, PET, polybutylene terephthalate, polymethyl methacrylate (PMMA), acrylic resin, polycarbonate (PC), polystyrene, cellulose triacetate, polyvinyl alcohol, polyvinyl chloride, polyvinylidene chloride, polyethylene, EVA, PVB, ethylene-methacrylic acid copolymer crosslinked by metallic ion, polyurethane and cellophane, preferably PET, PC and PMMA. A thickness of the conductive film preferably is in the range of 1 to 30 $\mu$m. The thickness of less than 1 $\mu$m is not capable of giving sufficient electro-magnetic interference property to the film due to so thin thickness. In case of more than 30 $\mu$m, the light transmission is apt to be reduced.

In (b) and (d) of FIG. 4, the organic resin layers 44A, 44B each have preferably a thickness of 0.1 to 3 mm although the thickness varied depending on uses of the glass. A conductive adhesive layer consisting of the organic resin layer 44A, the conductive film 45 and the organic resin layer 44B preferably has a thickness of 0.2 to 0.4 mm.

The glass improved in impact resistance having an electro-magnetic interference sealing property, shown in (b) and (d) of FIG. 4, can be easily prepared by piling a organic polymer film 43 and a glass plate 41, or a glass plates 41A, 44B, through the organic resin layers 44A, 44*b* having the conductive film 45 therebetween to give a composite, pre-laminating the composite under vacuum and heating, and then curing the organic resin under heating or irradiation to incorporate into one body.

The glass improved in impact resistance having an electromagnetic interference sealing property includes any composite wherein a conductive organic resin layer is inserted between the organic polymer film and the glass plate, or between the glass plates 41A, 41B, and is not restricted to the structures shown in FIGS. 4(*a*) to (*d*).

Instead of the conductive film shown in (b) and (d) of FIG. 4, for example, the followings can be employed;

(1) Conductive mesh:

The conductive mesh preferably comprises metallic fiber and/or organic fiber coated with metal thereon, and has linear diameter of 1 $\mu$m to 1 mm and degree of opening of 50 to 90%. In case the linear diameter is more than 1 mm, either the degree of opening or the electromagnetic interference sealing property are reduced, and therefore both these cannot be compatible. In case the linear diameter is less than 1 $\mu$m, the mesh is lowered in strength to make handling difficult. Further, in case the degree of opening is more than 90%, it is difficult to keep the mesh in the form of mesh. The opening of less than 50% reduces the light transmission. The linear diameter further preferably is in the range of 10 to 500 $\mu$m and the degree of opening is further preferably in the range of 60 to 90%. In the invention, the degree of opening means a ratio of an area of opening portion to a projected area of the conductive mesh.

Examples of metals for the metallic fiber and/or organic fiber coated with metal thereon include copper, stainless, aluminum, nickel, titanium, tungsten, tin, lead, iron, silver, carbon or alloys thereof, preferably copper, stainless or aluminum.

Examples of organic materials used in the organic fiber coated with metal include polyester, nylon, polyvinylidene chloride, aramid, Vinylon, and cellulose.

(2) Patternwise etched conductive foil (e.g., metallic foil):

Examples of metals for the metallic foil include copper, stainless, aluminum, nickel, iron, brass or alloys thereof, preferably copper, stainless or aluminum.

The thickness of the conductive foil preferably is in the range of 1 to 200 $\mu$m. In case of decreasing the thickness to excess, it is difficult to handle the foil and conduct pattern etching. In case of increasing the thickness to excess, a thickness of the glass is affected by the increasing and time period requiring for etching procedure is increased.

As method for pattern etching the metal foil, any conventional methods can be employed. However, preferred is a photo-etching method using a resist. The method is, for example, carried out by coating a photoresist on a metallic foil, patternwise exposing the resist to light (for example using an appropriate mask), and developing the exposed resist to form a resist pattern, and then etching the metallic foil in the area having the resist thereon by use of a etching liquid (e.g., copper (II) chloride solution).

The pattern etching method enables formation of various patterns. In more detail, the method is capable of etching the metallic foil so as to have a desired linear diameter, degree of opening and shape of opening. Therefore, the glass having a desired elector-magnetic interference sealing property and light transmission can be easily prepared.

The etched pattern may have any shapes. For example, the metallic foil is in the form of stripe which is obtained by forming square openings (pores) on the foil, or in the form of punching metal which is obtained by forming circle, hexagon, triangle or ellipse openings. The pores may be regularly arranged or irregularly arranged to form a random pattern.

To obtain both excellent elector-magnetic interference sealing property and light transmission, the ratio of an area of opening portion to a projected area of the metallic foil preferably is in the range of 20 to 90%.

The glass improved in impact resistance having an electromagnetic interference sealing property, may be prepared by bonding a glass plate having a conductive layer thereon and an organic polymer film or a glass plate, through the organic resin layer. The conductive layer formed on the glass plate includes, for example, the followings:

(a) Glass plate on which is patternwise printed with a conductive ink:

The above pattern of the conductive layer of conductive ink can be printed on the surface of the glass plate by a screen printing process, ink-jet printing process or electrostatic printing process using the following inks:

(1) Conductive ink containing 50 to 90% by weight of the following particles, where carbon black particles, or particles of metal such as copper, aluminum or nickel or alloys thereof, these particle size being not more than 100 $\mu$m, are dispersed in a binder resin such as PMMA, polyvinyl acetate or epoxy resin. The ink is diluted or dispersed with a solvent such as toluene, xylene, methylene chloride or water to form a liquid of an appropriate concentration, and the liquid is coated on the surface of the transparent plate by printing process and, if desired, dried at room temperature to 120° C.

(2) Particles obtained by covering the same conductive material as above (1) with a binder resin. The particles are directly applied onto the plate by electrostatic printing to be fixed using energy such as heating.

The pattern printing enables formation of various patterns. In more detail, the method is capable of forming the conductive layer so as to have a desired linear diameter, degree of opening and shape of opening. Therefore, the glass having a desired elector-magnetic interference sealing property and light transmission can be easily prepared.

The patternwise printed conductive layer may have any shapes. The printed layer is, for example, in the form of stripe which is obtained by forming square openings (pores) on the foil, or in the form of punching metal which is obtained by forming circle, hexagon, triangle or ellipse openings. The openings may be regularly arranged or irregularly arranged to form a random pattern.

To obtain both the elector-magnetic interference sealing property and light transmission, the ratio of an area of opening portion to a projected area of the printed layer preferably is in the range of 20 to 90%.

(b) Patternwise etched conductive layer (e.g., metallic layer) which is formed on a surface of a glass plate:

Examples of metals for the metallic layer include copper, stainless, chromium, aluminum, nickel, iron, brass or alloys thereof, preferably copper, stainless, aluminum or chromium.

Examples of processes for forming the metallic layer on the glass plate include electroless plating, vacuum metallizing, sputtering, chemical vapor phase deposition.

The thickness of the conductive layer preferably is in the range of 0.01 to 50 $\mu$m. In case of decreasing the thickness to excess, an electro-magnetic interference sealing property is reduced. In case of increasing the thickness to excess, a thickness of the glass is affected by the increasing and time period requiring for etching procedure is increased.

As method for pattern etching the metallic layer, any conventional methods can be employed. However, preferred is a photo-etching method using a resist. The method is, for example, carried out by coating a photoresist on a metallic layer, patternwise exposing the resist to light (for example using an appropriate mask), and developing the exposed resist to form a resist pattern, and then etching the metallic foil in the area having the resist thereon by use of a etching liquid (e.g., copper (II) chloride solution).

The pattern etching enables formation of various patterns. In more detail, the method is capable of forming the conductive layer so as to have a desired linear diameter, degree of opening and shape of opening. Therefore, the glass having a desired elector-magnetic interference sealing property and light transmission can be easily prepared.

The patternwise etched metallic layer may have any shapes. The etched layer is, for example, in the form of stripe which is obtained by forming square openings (pores) on the foil, or in the form of punching metal which is obtained by forming circle, hexagon, triangle or ellipse openings. The openings may be regularly arranged or irregularly arranged to form a random pattern.

To obtain both excellent elector-magnetic interference sealing property and light transmission, the ratio of an area of opening portion to a projected area of the metallic layer preferably is in the range of 20 to 90%.

(c) Transparent conductive film formed on a surface of a glass plate:

The transparent conductive film includes thin films formed from ITO (tin-indium oxide), ZnO, Al-doped ZnO or $SnO_2$. Further the transparent conductive film includes thin metallic films obtained by coating of metal such as silver or copper. The thickness of the film, although varies depending on desired extend of elector-magnetic interference sealing property and light transmission, generally is in the range of 1 Å to 5 $\mu$m in case of the metal oxide film, and generally is in the range of 5 to 3,000 Å in case of the metallic film.

The above-mentioned conductive layers can be employed in combination of two or more kinds. In the use of any conductive layer, it is important to take sufficiently account of desired light-transmission depending on uses of the glass (e.g., windshield, side or rear glass).

The glass improved in impact resistance having electro-magnetic interference sealing property can be employed in any vehicles such as cars and railway vehicles. Examples of the cars include motor car (e.g., sedan, wagon), track and bus; and examples of the railway vehicles include surface car and monorailway. Further the glass can be employed in wide public constructions such as hospital as well as university and laboratory.

The glass of the third invention uses, as an intermediate layer of two glass plates or of one glass plate and the organic polymer film, a specific organic resin layer. The organic resin layer includes two kinds of resin areas. In more detail, an outer area contains ethylene-vinyl acetate copolymer and an inner area contains polyvinyl butyral. Each of these areas may contain additives such as plasticizer and organic peroxide.

Referring to FIGS. 5 to 8, the glass improved in impact resistance of the invention which is effective in prevention of crimes in automobile is described in detail.

Figure 5:
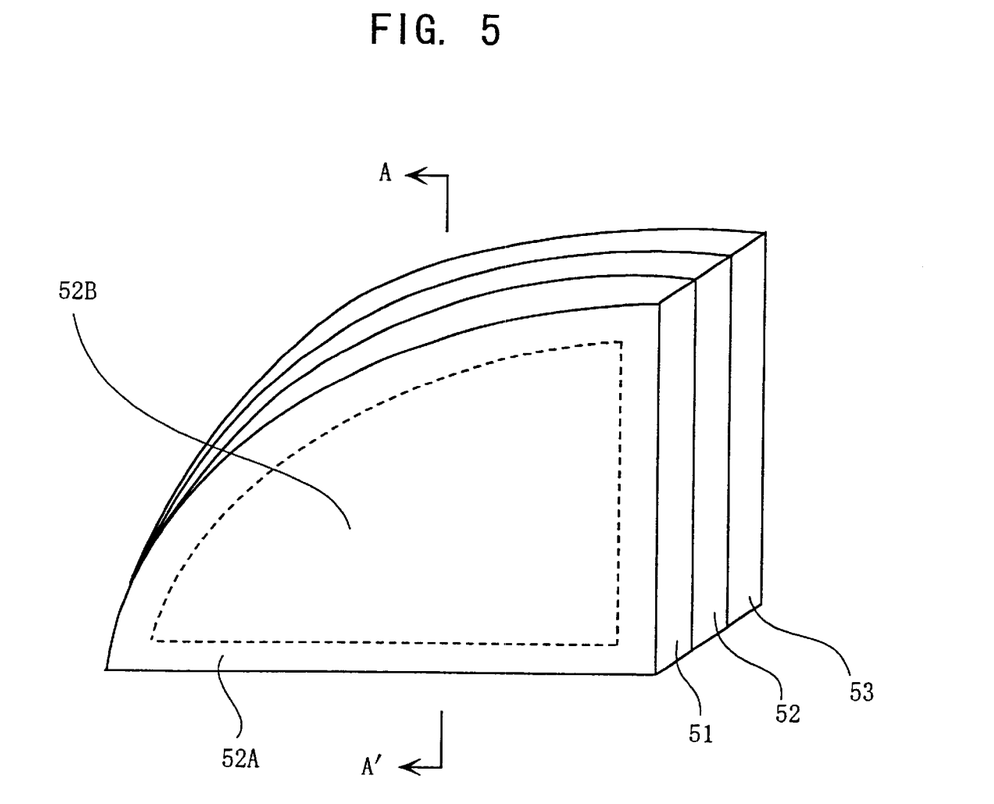
FIG. 5 is a perspective view for explaining a preferred embodiment of the glass improved in impact resistance of the third invention according to the invention.

In FIG. 5, glass plates 51, 53 are bonded each other through an organic resin layer 52. The organic resin layer 52 mainly contains EVA in a peripheral area 52A of the glass plate, while the layer 52 mainly contains PVB in a central area 52B that is a whole area other than the peripheral area. In more detail, EVA is used in the peripheral area 52A because it is excellent in water resistance though is not sufficiently satisfactory in transparency, whereby durability of the laminated glass is designed to be enhanced. In contrast, PVB is used in the central area 52B because it is excellent in transparency though is inferior to EVA in water resistance, whereby the laminated glass is designed to have intrinsic functions of glass.

Figure 6:
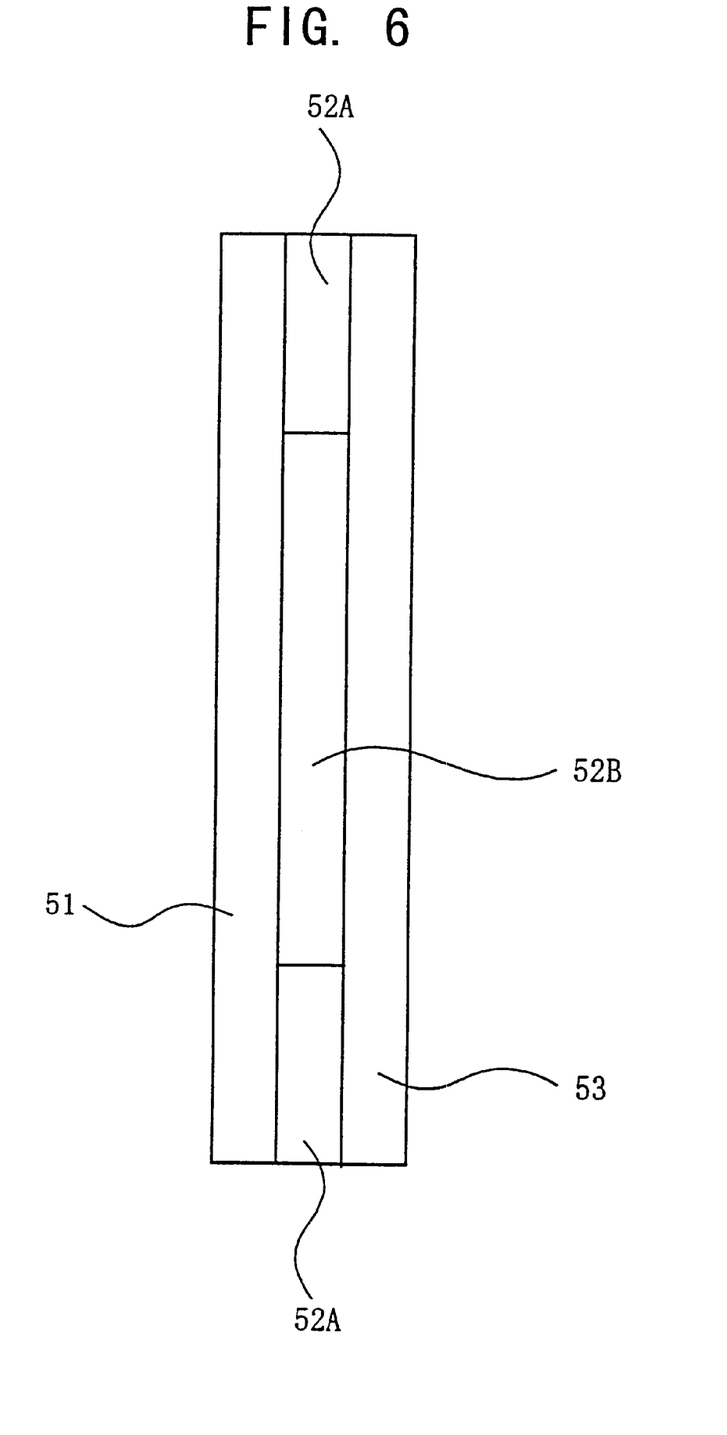
FIG. 6 is a section view taken along a line A–A' in FIG. 5.

FIG. 6 shows a section view of the glass improved in impact resistance (laminated glass).

Figure 7:
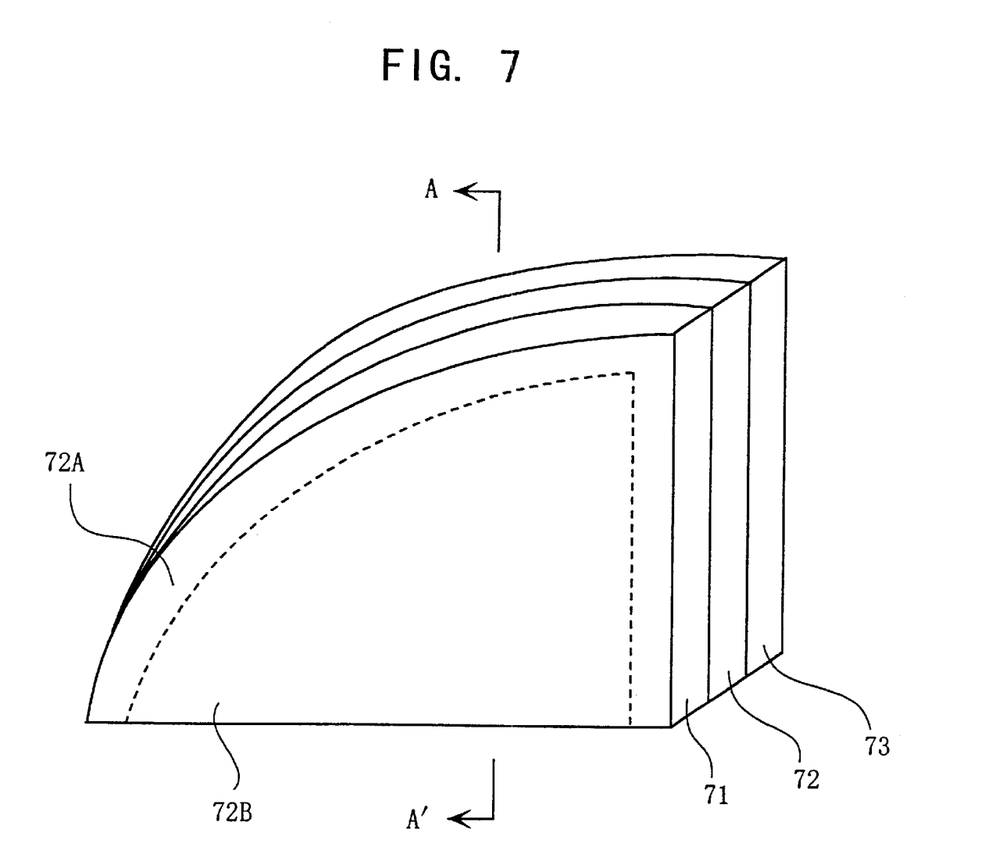
FIG. 7 is a perspective view for explaining another preferred embodiment of the glass improved in impact resistance of the third invention according to the invention, wherein EVA is used in a periphery part other than a lower edge of the glass plate.
Figure 8:
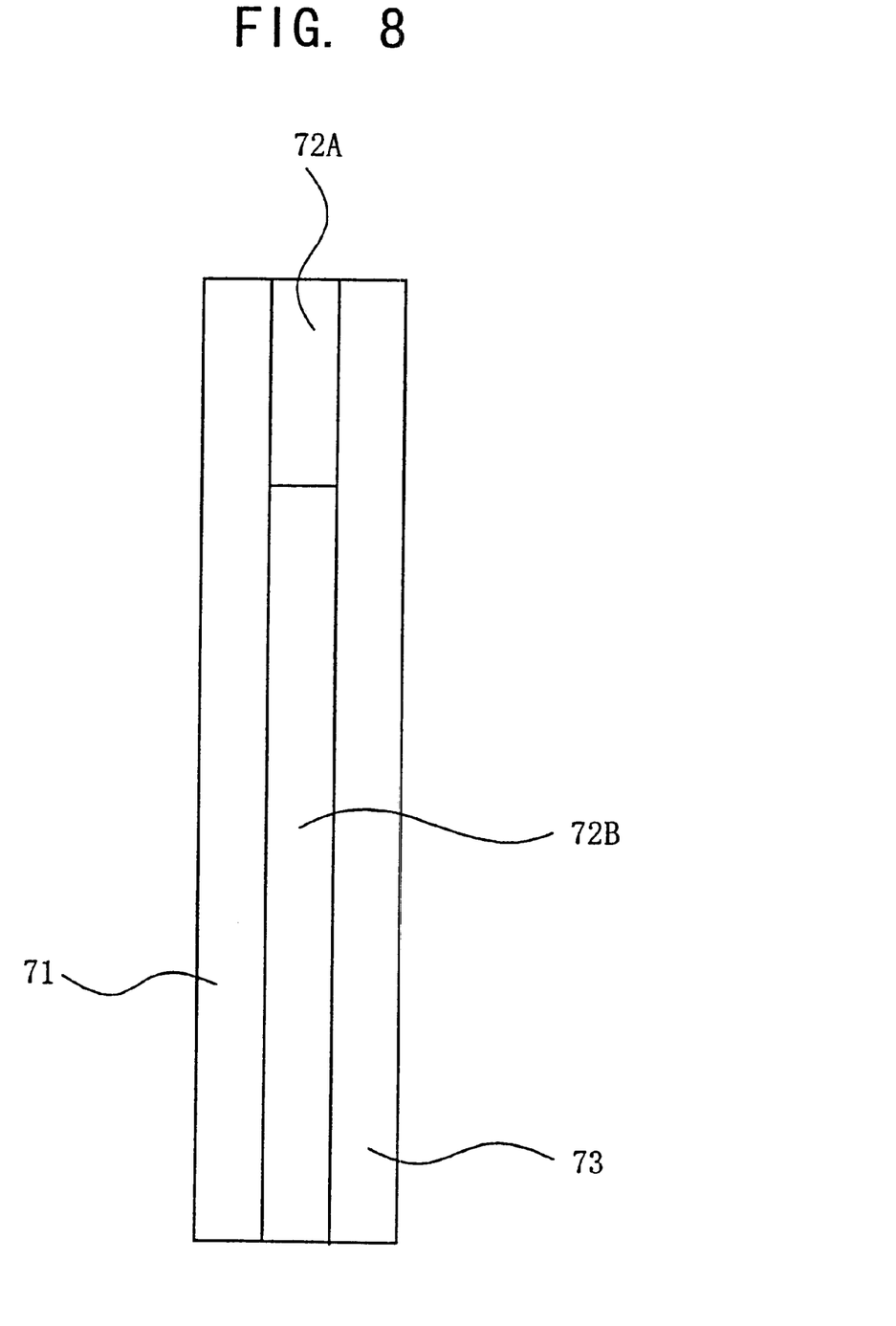
FIG. 8 is a section view taken along a line A–A' in FIG. 7.

In FIG. 7, glass plates 71, 73 are bonded each other through an organic resin layer 72. FIG. 8 shows this section view. From the consideration of the same object as FIG. 5, the organic resin layer 72 mainly contains EVA in a peripheral area 72A of the glass plate, but the peripheral area is an area where the lower edge is excluded. In more detail, to facilitate the preparation of the organic resin layer and reduce cost for the preparation, the organic resin layer mainly containing EVA is used in at least upper edge of the glass plate. The upper edge corresponds to, for example, a most upper side of door glass that is in contact with a frame of a window when the glass of the window is moved in the upper direction. The forming area of the organic resin layer mainly containing EVA can be varied depending upon shape of a window, for example an exposed area of edge of the glass. Further, the organic resin layer mainly containing EVA is preferably formed on a whole area excluding the lower edge area of the periphery area, as shown FIG. 5.

PVB is used in the central area excluding the above area such as the upper edge in the same manner as FIG. 5. In more detail, EVA is used in the peripheral area 72A because it is excellent in water resistance though is not sufficiently satisfactory in transparency, whereby durability of the laminated glass is designed to be enhanced. In contrast, PVB is used in the central area 72B because it is excellent in transparency though is inferior to EVA in water resistance, whereby the laminated glass is designed to have intrinsic functions of glass.

The glass plates 51, 53 and 71, 73 of the invention generally comprises silicate glass as described previously. In case the glass improved in impact resistance is used as a side glass or inserted glass of automobile, the glass plate need not have the thickness of a windshield and therefore its thickness is generally in the range of 1 to 10 mm, preferably 3 to 5 mm. The glass plates 51, 53 and 71, 73 are tempered to have good heat or chemical resistance.

The organic resin layers 52, 72 are lowered in penetration resistance when the thickness is reduced, and they are decreased in transparency in case of the large thickness. Therefore the organic resin layers need not have so large thickness as used in a windshield in view of use in a side glass or rear glass, and hence preferably have a thickness of 0.1 to 10 mm.

The laminated glass having the organic resin layer 52, 72 can be, for example, prepared by placing on one glass plate an EVA sheet in the form of flame which has been cut to the same periphery shape as the glass plate, placing a PVB sheet on the central area 52B, 72B in which the surface of the glass plate is exposed due to no provision of EVA sheet, and superposing the other glass plate on the EVA and PVB sheets to be bonded each other. The size of the EVA sheet (area) may be determined so as not to damage transparency with keeping moisture resistance.

By providing a resin composition containing EVA on the periphery edge 52A, 72A of the glass plate, it is possible to prevent the peeling between the glass plates of the laminated glass. In more detail, in case the resin composition containing EVA is used in, for example, a door glass of an automobile, the periphery area, especially the upper edge, of the door glass is frequently in contact with the window flame of the door glass. However, the periphery area is enhanced in moisture resistance to greatly prevent the peeling between the glass plates of the laminated glass. Further, the PVB sheet is provided on the central area 52B, 72B other than the periphery area of the glass plate, and therefore the central area can hold transparency as mentioned above. Furthermore, the laminated glass of the invention has a structure comprising two glass plates 51, 53 or 71, 73 and an organic resin layer provided therebetween, and therefore it can be employed as a laminated glass for prevention of crimes, because even if the laminated glass is destroyed for the purpose of crimes, pieces of the destroyed glass are bound by the organic resin layer 52, 72 not to permit the door to open.

For EVA used in the organic resin layer 52, 72, those indicated in the first invention can be employed.

PVB used in the organic resin layer generally is polyvinyl acetal resin mainly consisting of vinyl butyral unit, preferably polyvinyl acetal resin having a composition of 50 to 70 molar % of vinyl butyral unit, 15 to 50 molar % of vinyl alcohol and 20 or less molar % (especially 0.5 to 20 molar %) of vinyl acetate. In case the vinyl butyral unit is in the amount of less than 50 molar %, the resin is lowered in compatibility with plasticizer. In contrast, in case the vinyl butyral unit is in the amount of more than 70 molar %, the layer is reduced in penetration. Further, in case the vinyl acetate unit is in the amount of more than 20 molar %, the resin is lowered in transparency.

Polymerization degree of the resin preferably is in the range of 600 to 2,000. In case of the degree of less than 600, the strength of the layer is reduced not to give sufficient impact resistance. In case of the degree of more than 2,000, the resin is reduced in processing properties owing to high viscosity to render the formation of the resin layer difficult.

The organic resin layer may contain additives such as plasticizer, organic peroxide and adhesion-enhancing agent, which are used in PVB of the second invention.

The organic resin layer of the glass improved in impact resistance of the third invention according to the invention can be obtained by forming product in the form of sheet by means of extruding molding or calender molding. Otherwise, the organic resin layer can be prepared by mixing the above-mentioned resin composition (various additives and an adhesive resin) in a solvent to form a coating liquid, and applying the coating liquid onto a support by means of an appropriate coater and drying the coated liquid to form product in the form of sheet.

The glass improved in impact resistance can be prepared by, for example, bonding two glass plates to both sides of the organic resin layer (i.e., intermediate layer) in the form of sheet. In this process, EVA is bonded onto the periphery edge 52A or the periphery edge other than the lower edge of the glass plate, while the PVB sheet is bonded onto the central area 52B other than the periphery area of the glass plate. Thereafter, the resultant composite having sandwich structure is degassed and pressured under heating, whereby the glass improved in impact resistance can be obtained. Even if the edge portions are not precisely bonded, which is different from those shown in FIGS. 5, 6, the composite can be incorporated. For example, even if the edges of EVA sheet and PVB sheet are a little interposed, the composite can be incorporated. Further, in case the opening between the EVA sheet and PVB sheet is not more than 1 mm, they can bonded under melting each other.

The obtained laminated glass can be generally employed as a rear glass, a door glass and an inserted glass of an automobile, preferably a door glass and an inserted glass, especially a door glass.

EXAMPLE

The invention is illustrated in detail using the following Examples.

Example 1

(Preparation of a Glass For Automobile)

On a glass plate having thickness of 5 mm, which had been beforehand washed and dried, an EVA organic resin film (thickness of 200 $\mu$m) and a PET film (thickness of 200 $\mu$m) were superposed, and the glass having the films was put into a rubber case to be degassed in a vacuum and then preliminary bonded at 80° C. under pressure. The glass bonded to the films was introduced into an oven and pressed at 150° C. for 30 minutes.

(Evaluation on a Film-reinforced Glass).

The resultant glass showed a high transparency and no optical distortion, and further was excellent in impact resistance and penetration resistance. Thus, the glass is suitable for a side glass or rear glass of automobiles.

A process for the preparation of the glass for automobiles described in Example 1 can be utilized for the preparation of glass constructions having the same structure as the glass, such as a window glass of a railway vehicle.

Example 2
(Preparation of a Glass for Automobile)

On a glass plate having thickness of 5 mm, which had been beforehand washed and dried, an EVA organic resin film (thickness of 200 μm) containing 1% by weight of benzoin methyl ether and a PET film (thickness of 200 μm) were superposed, and then a high scratch resistance hard coat (UV curable resin; trade name: UVCH1105, available from Toshiba Silicone Corp.; 50 wt. % organic solvent solution) and a hard coat having antistatic properties (UV curable resin; trade name: Sunrad UXH601, available from Sanyo Chemical Industries Co., Ltd.; 50 wt. % organic solvent solution) were coated in this order on a surface of the PET film by a roll coater. Further a strippable sheet of PET was superposed on the coated layer.

The resultant laminate was put into a rubber case to be degassed in a vacuum and then preliminary bonded under pressure at 80° C. The surface of the bonded laminate was exposed to ultraviolet rays (UV lamp of 1 kW/cm, irradiation distance: 20 cm, irradiation time: 30 seconds) to form a hard coat (total thickness of 10 μm) with crosslinking the organic resin film (EVA film).

(Evaluation on a Film-reinforced Glass)

The resultant glass showed a high transparency and no optical distortion, and further was excellent in impact resistance, penetration resistance and scratch resistance (surface hardness of the hard coat: 8H) as well as fog resistance. Thus, the glass is suitable for a side glass or rear glass of automobiles.

The glass was used as side glasses for an automobile. Though the automobile was conditioned under its outer temperature of 10° C. and its inner temperature of 30° C. and 60% RH, there was no occurrence of fog on the glass.

A process for the preparation of the glass for automobiles described in Example 2 can be utilized for the preparation of glass constructions having the same structure as the glass, such as a window glass of a railway vehicle.

Example 3
(Preparation of a Glass for Automobile)

On a glass plate having thickness of 5 mm, which had been beforehand washed and dried, an EVA organic resin film (thickness of 200 μm) containing 1% by weight of benzoin methyl ether and a PET film (thickness of 200 μm) were superposed, and then a conductive hard coat (UV curable resin; trade name: Conductive EJ-3, available from Dai Nippon Toryo Co., Ltd.; 50 wt. % organic solvent solution) and a hard coat having scratch resistance (UV curable resin; trade name: UVCH1105, available from Toshiba Silicone Corp.; 50 wt. % organic solvent solution) were coated in this order on a surface of the PET film by a roll coater. Further a strippable sheet of PET was superposed on the coated layer.

The resultant laminate was put into a rubber case to be degassed in a vacuum and then preliminary bonded under pressure at 80° C. The surface of the bonded laminate was exposed to ultraviolet rays (UV lamp of 1 kW/cm, irradiation distance: 20 cm, irradiation time: 30 seconds) to form a hard coat (total thickness of 10 μm) with crosslinking the organic resin film (EVA film).

(Evaluation on a Film-reinforced Glass)

The resultant glass showed a high transparency and no optical distortion, and further was excellent in impact resistance, penetration resistance and scratch resistance (surface hardness of the hard coat: 6H). Thus, the glass is suitable for a side glass or rear glass of automobiles.

Six sheets of the glass were used to form a hexahedron (i.e., hollow cube), inside which a cellular phone was placed. Then, though the cellular phone was put in a call to, it did not receive the call.

A process for the preparation of the glass for automobiles described in Example 3 can be utilized for the preparation of glass constructions having the same structure as the glass, such as a window glass of a railway vehicle.

Examples 4 and 5, and Comparison Example 1

An adhesive resin film (organic resin film) used in Examples 4 and 5, and Comparison Example 1 was prepared as follows:

(Preparation of Adhesive Resin Film)

To 100 weight parts of EVA (Ultrasene 634, available from Toyo Soda Kogyo Co., Ltd.; 26% of vinyl acetate; Melt Index: 4), 1 weight part of 1,1-bis(t-butylperoxy)-3,3,5-trimethylcyclohexane (Perhexa 3M, available from NOF Corp.), 0.1 weight part of γ-methacryloxypropyltrimethoxysilane, 2 weight parts of diallylphthalate and 0.5 weight part of UV-absober (Sumisolve 130, available from Sumitomo Chemical Co., Ltd.) and further conductive particles wherein a kind shown in Table 1 was used in an amount in Table 1 were added and mixed, to prepare an adhesive resin film using a 40 mm-extruder. In Comparison Example 1, no conductive particles were added.

On a glass plate having thickness of 5 mm, which had been beforehand washed and dried, an adhesive resin film containing conductive particles shown in Table 1 (however not contained in Comparison Example 1) and a PET film (thickness of 0.1 mm) were superposed. The resultant laminate was put into a rubber case to be degassed in a vacuum and then preliminary bonded under pressure at 80° C. The glass bonded to the films was introduced into an oven and pressed at 150° C. for 30 minutes.

The resultant glass showed a high transparency and no optical distortion, and further was excellent in moisture vapor resistance, impact resistance and penetration resistance.

The resultant glasses were investigated as to whether a cellular phone can be used or not, and light transmission according to the following methods.

(Whether a Cellular Phone is Used or Not)

Six sheets of the glass were used to form a hexahedron (i.e., hollow cube), inside which a cellular phone was placed. Then, it was investigated whether, in case the cellular phone was put in a call to, it receive or not the call.

(Light Transmission (%))

A mean visible light transmission (%) in a wavelength range of 380 to 780 nm was measured using a visible light and ultraviolet spectrometer (U-4000, available from Hitachi, Ltd.)

The obtained results are shown in Table 1.

TABLE 1

| Example | Conductive particles | | Use of phone | Light transmission (%) |
|---|---|---|---|---|
| | Kind* | Mixed proportion | | |
| Example 4 | A | 1 wt. % | unusable | 72 |
| Example 5 | B | 1 wt. % | unusable | 64 |
| Com. Ex. 1 | — | 0 wt. % | usable | 80 |

Note*:
A: Polystyrene particles of particles size of 0.1 mm on which Ni plating is coated;
B: Conductive carbon black particles.

Example 6

On one of two float glass plates having a thickness of 3 mm, which had been beforehand washed and dried, an EVA sheet having a width of 20 mm in the form of flame which had been cut to the same periphery shape as the glass plate was first placed, and subsequently a PVB intermediate sheet was placed on the central area in which the surface of the glass plate is exposed due to no provision of EVA sheet, and then the other glass plate was superposed on the EVA and PBV sheets to be bonded each other, whereby a three layered laminate was obtained. The resultant laminate was put into a rubber case to be degassed in a vacuum and then preliminary bonded under pressure at 80° C. (which has a structure shown in FIG. 5). The glass bonded to the films was introduced into an oven and pressed at pressure of 5 kg/cm$^2$ and temperature of 150° C. for 30 minutes.

The resultant combined glass showed a high transparency and no optical distortion, and further was excellent in moisture vapor resistance, impact resistance and penetration resistance.

Example 7

On one of two float glass plates having a thickness of 3 mm, which had been beforehand washed and dried, an EVA sheet having a width of 20 mm in the form of flame which had been cut to the same periphery shape, which has no lower edge area, as the glass plate was first placed, and subsequently a PVB intermediate sheet was placed on the central area in which the surface of the glass plate is exposed due to no provision of EVA sheet, and then the other glass plate was superposed on the EVA and PBV sheets to be bonded each other, whereby a three layered laminate was obtained. The resultant laminate was put into a rubber case to be degassed in a vacuum and then preliminary bonded under pressure at 80° C. The glass bonded to the films (which has a structure shown in FIG. 7) was introduced into an oven and pressed at pressure of 5 kg/cm$^2$ and temperature of 150° C. for 30 minutes.

The resultant combined glass showed a high transparency and no optical distortion, and further was excellent in moisture vapor resistance, impact resistance and penetration resistance.

As apparent from the above description, the glass improved in impact resistance of the first invention is prepared by superposing an organic resin layer containing ethylene-vinyl acetate copolymer on a glass plate, placing a film comprising an organic polymer on the layer and bonding the glass having these films one another under pressure. Therefore, though the resultant laminate has a small thickness, it can have excellent impact resistance and penetration resistance and be effective in prevention of crimes.

The glass improved in impact resistance having electromagnetic interference sealing property according to the first or third invention allows reception of radio wave within an automobile or a building such as a hospital or a railway vehicle impossible. Thus, the cellular phone cannot be used within an automobile or a building, which prevents occurrence of traffic accidents or occurrence of adverse effect to a pacemaker or inspection machine owing to the use of the cellular phone.

The glass improved in impact resistance of the forth invention is interposed an organic resin layer between two glass plates by arranging an EVA sheet on periphery portion or at least upper periphery portion of one glass plate and a PVB sheet on the central area of the glass plate. Therefore, the glass of the invention is excellent in prevention of crime and soundproof properties, and further has proper impact resistance and penetration resistance so that it can be destroyed in case of emergency such as traffic accident. Hence, the glass improved in impact resistance of the invention is suitable for a laminated glass for crime prevention of automobile.

Description of Reference Number

1, 11, 13, 41, 41A, 44B, 51, 53, 71, 73: One glass plate

2, 42, 44A, 44B, 52, 72: Organic resin film

3, 43: Organic polymer film

45: Conductive film

52A, 72A: Periphery edge

52B, 72B: Central area

What is claimed is:

1. A glass improved in impact resistance which comprises a glass plate, either another glass plate or an organic polymer film and an organic resin layer provided therebetween, wherein the organic resin layer contains ethylene-vinyl acetate copolymer in an area including at least a part of a peripheral area of the glass plate, and contains polyvinyl butyral in the other area.

2. The glass improved in impact resistance as defined in claim 1, the area including at least a part of a peripheral area of the glass plate corresponds to a whole peripheral area of the glass plate.

3. The glass improved in impact resistance as defined in claim 1 or 2, wherein a portion containing ethylene-vinyl acetate copolymer of the organic resin layer and a portion containing polyvinyl butyral have each formed separately in the form of sheet, and each of the portions has been bonded in a predetermined position under pressure.

4. The glass improved in impact resistance as defined in claim 1 or 2, wherein a portion containing ethylene-vinyl acetate copolymer of the organic resin layer and a portion containing polyvinyl butyral have been provided separately in a predetermined position by a coating method.

5. The glass improved in resistance impact resistance as defined in claim 1, wherein the ethylene-vinyl acetate copolymer has been cured.

6. The glass improved impact resistance as defined in claim 1, wherein the organic resin layer contains conductive material dispersed therein.

7. The glass improved in impact resistance as defined in claim 1, wherein the organic polymer of the film is polyethylene terephthalate.

8. The glass improved in impact resistance as defined in claim 1, wherein the hard coating layer is formed on a surface of the film.

9. The glass improved in impact resistance as defined in claim 8, wherein the hard coating layer has been formed from an ultraviolet curing resin.

* * * * *